United States Patent
Tang et al.

(10) Patent No.: US 10,725,668 B1
(45) Date of Patent: Jul. 28, 2020

(54) DATA SEPARATION DURING GARBAGE COLLECTION AND WEAR LEVELING

(71) Applicant: SK hynix Inc., Gyeonggi-do, OT (KR)

(72) Inventors: Xiangyu Tang, San Jose, CA (US);
Jason Bellorado, San Jose, CA (US);
Lingqi Zeng, San Jose, CA (US);
Zheng Wu, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 208 days.

(21) Appl. No.: 14/817,118

(22) Filed: Aug. 3, 2015

Related U.S. Application Data (60) Provisional application No. 62/043,597, filed on Aug. 29, 2014.

(51) Int. Cl.
    *G06F 12/00* (2006.01)
    *G06F 3/06* (2006.01)
    *G06F 12/06* (2006.01)

(52) U.S. Cl.
    CPC ............ *G06F 3/0619* (2013.01); *G06F 3/064* (2013.01); *G06F 3/0646* (2013.01); *G06F 3/0652* (2013.01); *G06F 3/0679* (2013.01); *G06F 12/06* (2013.01); *G06F 2212/202* (2013.01); *G06F 2212/7205* (2013.01); *G06F 2212/7211* (2013.01)

(58) Field of Classification Search
    CPC ...... G06F 3/0619; G06F 3/064; G06F 3/0646; G06F 3/0652; G06F 3/0679; G06F 12/06; G06F 2212/7211; G06F 2212/7205; G06F 2212/202
    See application file for complete search history.

(56) References Cited

U.S. PATENT DOCUMENTS

| | | | |
|---|---|---|---|
| 9,652,381 B2 * | 5/2017 | Higgins | G06F 12/0253 |
| 9,710,176 B1 | 7/2017 | Tang et al. | |
| 9,747,202 B1 * | 8/2017 | Shaharabany | G06F 12/0253 |
| 2004/0080985 A1 * | 4/2004 | Chang | G06F 12/0246 365/185.33 |
| 2005/0204187 A1 * | 9/2005 | Lee | G06F 12/0246 714/6.13 |
| 2006/0161728 A1 * | 7/2006 | Bennett | G06F 12/0246 711/103 |
| 2008/0109590 A1 * | 5/2008 | Jung | G06F 12/0246 711/103 |
| 2009/0248964 A1 * | 10/2009 | Yano | G06F 12/0246 711/103 |
| 2011/0029715 A1 * | 2/2011 | Hu | G06F 12/0246 711/103 |
| 2011/0264843 A1 * | 10/2011 | Haines | G06F 12/0246 711/103 |
| 2012/0226962 A1 * | 9/2012 | Franceschini | G11C 16/349 714/766 |

\* cited by examiner

*Primary Examiner* — Kalpit Parikh
(74) *Attorney, Agent, or Firm* — IP & T Group LLP (57) ABSTRACT

A type of data relocation to perform on a group of solid state storage cells is selected from a group that includes garbage collection and wear leveling. Source blocks in the group of solid state storage cells are identified using the selected type of data relocation. The source blocks are read in order to obtain relocated data and the relocated data is stored in an open block in the group of solid state storage cells. Relocated data associated with the selected type of data relocation is stored in the open block and relocated data associated with the unselected type of data relocation is excluded from the open block.

14 Claims, 6 Drawing Sheets

FIG. 6 understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

DATA SEPARATION DURING GARBAGE COLLECTION AND WEAR LEVELING

CROSS REFERENCE TO OTHER APPLICATIONS

This application claims priority to U.S. Provisional Patent Application No. 62/043,597 entitled REDUCING WRITE AMPLIFICATION AND IMPROVING WEAR SPREAD THROUGH DATA SEPARATION DURING GARBAGE COLLECTION AND WEAR-LEVELING filed Aug. 29, 2014 which is incorporated herein by reference for all purposes.

BACKGROUND OF THE INVENTION

Solid state storage (e.g., NAND Flash) has some background management processes that are unique to it compared to other types of storage, such as hard disk drive (HDD) storage. For example, a solid state storage controller will periodically perform a data relocation operation on the solid state storage media. A data relocation operation may be a garbage collection operation or a wear leveling operation, both of which are described in more detail below. New techniques related to data relocation which improve system performance would be desirable. For example, write amplification is one type of performance metric for solid state storage systems where it is desirable to have a lower write amplification value. It would be desirable to have new data relocation techniques that lower the write amplification value of a solid state storage system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
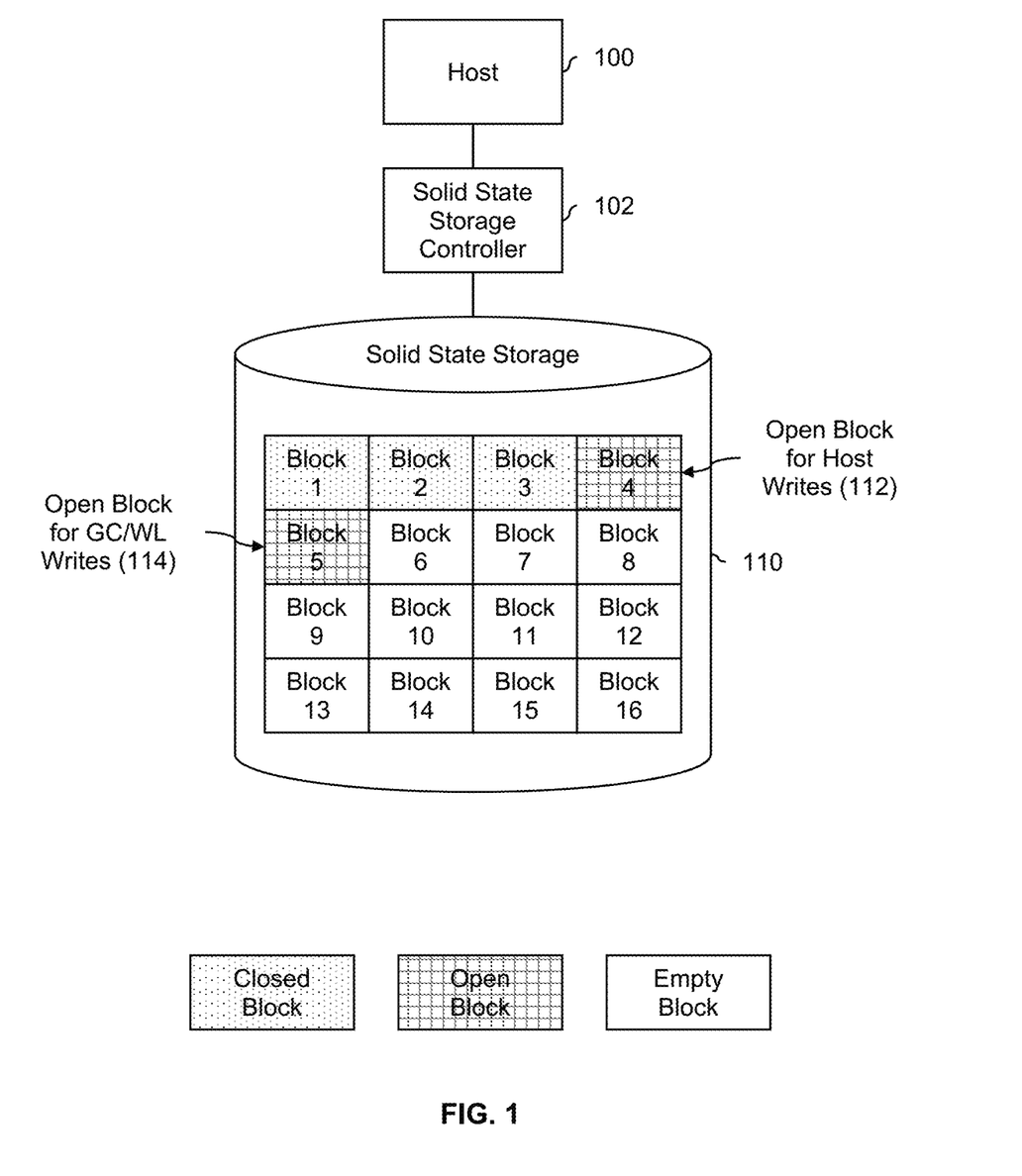
FIG. 1 is a diagram illustrating an embodiment of a solid state storage system with two open blocks.

FIG. 1 is a diagram illustrating an embodiment of a solid state storage system with two open blocks. In the example shown, solid state storage controller 102 sits between host 100 and solid state storage 110. Naturally, the number and arrangement of blocks shown in solid state storage 110 is merely exemplary and is not intended to be limiting. In various embodiments, solid state storage 110 may include an array of storage, any number of semiconductor chips/dies, and/or any number of semiconductor packages.

In this example, solid state storage 110 includes a 4×4 array of blocks for a total of 16 blocks (at least in this example). Blocks in solid state storage 110 are in one of three states: closed (e.g., the block has data stored in it, but the block is no longer actively being written to), open (e.g., the block is in the process of being written to, either with host data or relocated data, but is not yet full or closed), or empty (e.g., the block is in an erased state and can be opened for writing, if desired). In this particular example, the first three blocks are closed, the fourth block (112) is open for writes from the host (100), and the fifth block (114) is open for garbage collection or wear leveling writes (where garbage collection and wear leveling may more generally be referred to as data relocation). Blocks 6-16 in solid state storage 110 are empty.

Host 100 sends data to solid state storage controller 102 to be written or otherwise stored on solid state storage 110. Such writes are sometimes referred to as host writes and the write data received from the host is sometimes referred to as host data. The host data is stored in the open block for host writes (112), which is currently the fourth block. Naturally, when the fourth block gets full, the fourth block is closed and another block is selected from the set of empty blocks and is opened. That newly opened block would then be the open block in which host data is written to.

The other open block (i.e., open block 114) is used to store relocated data, for example from a garbage collection operation or a wear leveling operation. The following figure shows an example of blocks related to a data relocation operation.

Figure 2:
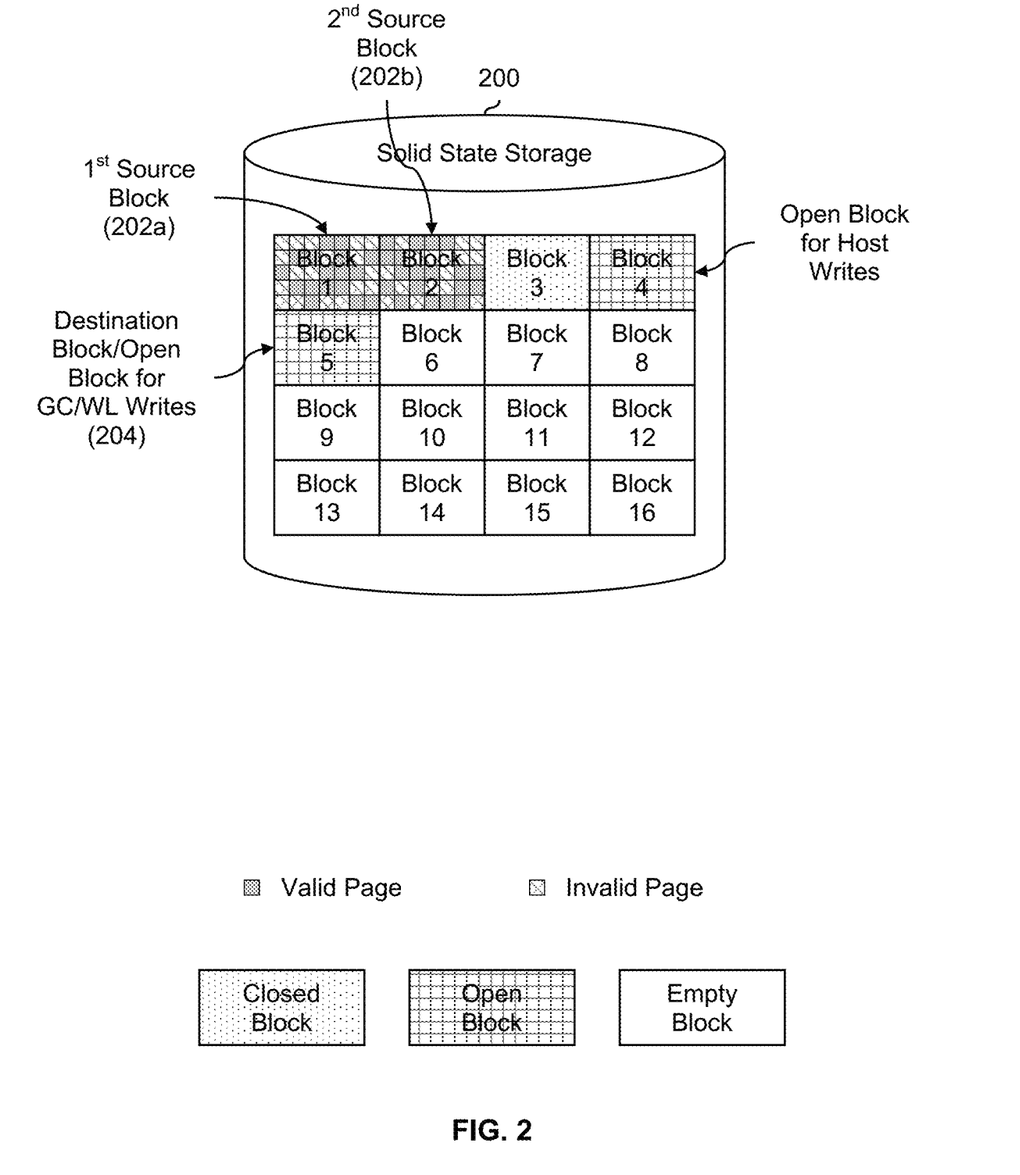
FIG. 2 is a diagram illustrating an embodiment of source blocks and a destination block associated with a data relocation operation.

FIG. 2 is a diagram illustrating an embodiment of source blocks and a destination block associated with a data relocation operation. FIG. 2 continues the example of FIG. 1. For brevity, host 100 and solid state storage controller 102 from FIG. 1 are not shown in this figure.

As in the previous figure, the fifth block (204) is the open block to which garbage collected data or wear leveled data is written. In this figure, block 204 is also called the destination block to clearly show that it is the destination corresponding to source blocks 202a and 202b.

Source blocks 202a and 202b are selected either by a garbage collection operation or a wear leveling operation, depending upon which type of data relocation operation is being performed. Garbage collection and wear leveling are both referred to as data relocation operations because they both relocate or otherwise move (valid) data within solid state storage 200 from one location to another location. However, the two differ in the manner in which source blocks and/or destination blocks are selected. Before explaining garbage collection and wear leveling, it may be helpful to describe some aspects of solid state storage systems.

In solid state storage systems, in-place updates of blocks cannot be performed. Instead, pages within a block are marked as invalid in the event newer data makes a particular page obsolete. In this figure, for example, valid pages in source blocks 202a and 202b are shown with a shaded pattern and invalid pages are shown with a diamond pattern. In garbage collection, the objective is to free up blocks so that a closed block (e.g., which includes some combination of valid data and invalid data) can be erased and become an empty block available for writing. As such, a common technique for selecting source block(s) during garbage collection is to select the block(s) with the fewest valid pages (or, conversely, the most invalid pages) in order to efficiently free up blocks (e.g., using the fewest number of program operations and/or erase operations, which are overhead operations and in the long run are damaging to the solid state storage media).

During wear leveling, the objective is to free up block(s) with a relatively low amount of wear (e.g., compared to the rest of the blocks in the solid state storage systems) so that blocks with low amounts of wear can be erased and/or programmed, both of which contribute to the wear of a block. In solid state storage systems, it is desirable to evenly wear out blocks so that one block does not have a lot of wear while another block has very little wear. One reason why this is desirable is because sometimes only a single progressive incremental step pulse program (PISPP) setting is available for the entire system, which can result in large errors or a low programming speed if the wear spread is large.

To measure wear (e.g., for a given block) and wear spread (e.g., across a group of blocks), many systems keep track of the program/erase (P/E) count of each block, where the P/E count is the number of programs plus the number of erases experienced by a particular block. Thus, keeping the wear spread low often corresponds to keeping the difference between the highest P/E count and the lowest P/E count low for a group of blocks. A common technique for selecting source block(s) in wear leveling is to pick the block(s) having the lowest P/E count, so that the block can hopefully experience more program operations and/or erase operations so that its P/E count catches up with the rest of the blocks.

Returning to FIG. 2, source blocks 202a and 202b may have been picked by a garbage collection operation (e.g., because they have the fewest number of valid pages) or by a wear leveling operation (e.g., because they have a relatively low P/E count). Regardless, the source blocks 202a and 202b are read and at least some of the valid data in those blocks is written to destination block 204. Since the invalid data in source blocks 202a and 202b is obsolete, it is not necessary to write the invalid data to destination block 204. In some embodiments, a data relocation operation picks or otherwise selects enough source blocks so that the number of valid pages in the selected source blocks (e.g., there are 36 valid pages in source blocks 202a and 202b) is greater than or equal to the number of pages in the destination block (e.g., there are 35 pages per block). This may be desirable because there will be no empty pages in the destination block after the data relocation operation is complete.

It is noted that the total number of valid pages in source blocks 202a and 202b (i.e., 36 valid blocks) is strictly greater than the number of pages in a destination block (i.e., 35 blocks) and thus there are extra valid pages. To handle this, one of the valid pages in source blocks 202a and 202b may remain marked as a valid page in source blocks 202a or 202b (e.g., essentially leaving that valid page behind in either source block 202a or 202b), whereas the other valid pages become invalid in source blocks 202a and 202b because they are copied to destination block 204.

In solid state storage systems where there are two open blocks (e.g., FIGS. 1 and 2), it may be desirable to perform data relocation in the manner described below. Such a data relocation process may, for example, reduce the amount of write amplification in the solid state storage system.

Figure 3:
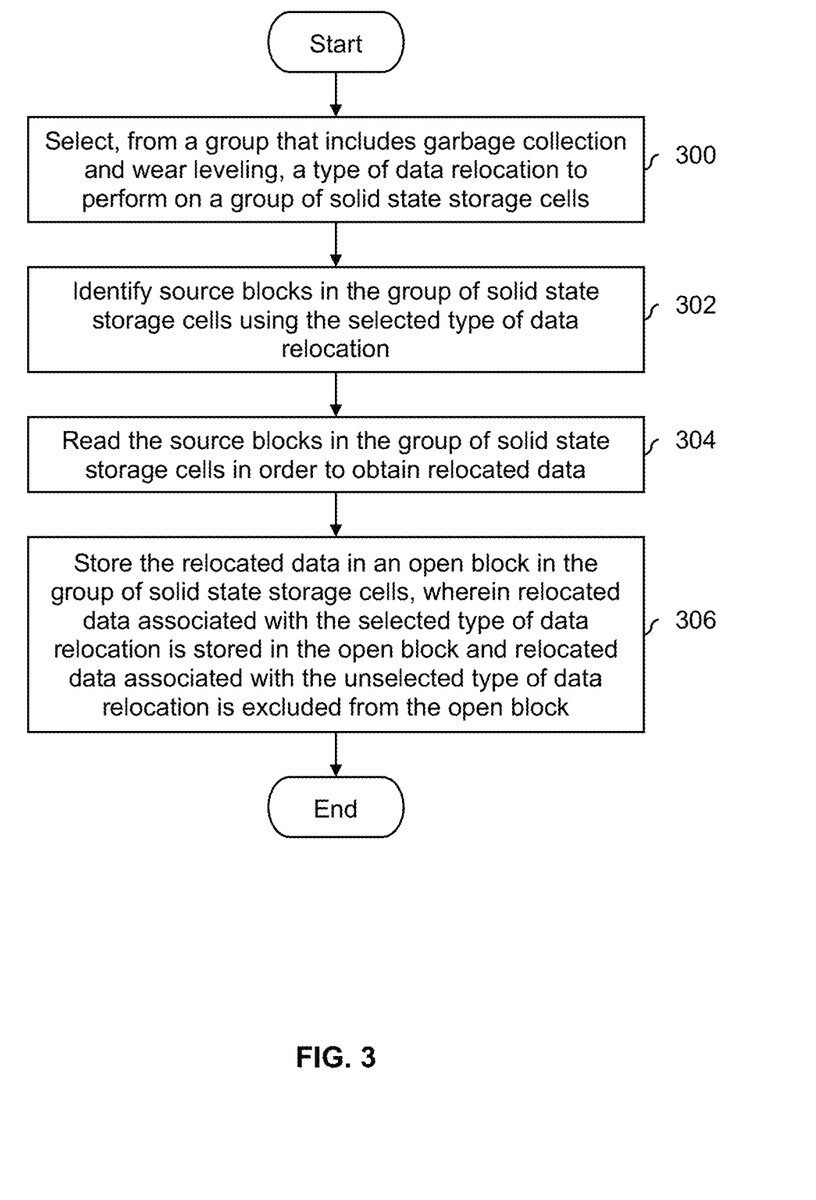
FIG. 3 is a flowchart illustrating an embodiment of a data relocation process.

FIG. 3 is a flowchart illustrating an embodiment of a data relocation process. In some embodiments, the process is performed by a solid state storage controller, such as solid state storage controller 102 in FIG. 1. In some embodiments, such a solid state storage controller is implemented as a semiconductor device, such as an application-specific integrated circuit (ASIC) or a field-programmable gate array (FPGA).

At 300, a type of data relocation to perform on a group of solid state storage cells is selected from a group that includes garbage collection and wear leveling. To put it another way, step 300 decides whether to perform garbage collection or wear leveling. In one example, a stolid state storage controller may have two blocks or modules that respectively determine (e.g., based on a timer and/or certain conditions or events being satisfied) when to perform garbage collection and when to perform wear leveling. Such blocks may be referred to as a garbage collection monitor and a wear level monitor, respectively. Any appropriate technique may be used, but as an example of the first, a monitor indicates that it is time to perform garbage collection if the number of empty blocks goes below some threshold. As an example of the second, a monitor indicates that it is time to perform wear leveling if the number of blocks having a P/E count outside of some window around the average number of P/E counts (e.g., $\mu \pm \delta$) is greater than some threshold (e.g., $n_{with\ P/E\ count\ outside\ of\ \mu \pm \delta}$>threshold). A controller (sometimes referred to herein as a data relocation controller) may arbitrate between the two monitors, for example, selecting the data relocation operation that first signals that its data relocation operation should be performed.

At 302, source blocks in the group of solid state storage cells are identified using the selected type of data relocation. For example, as described above, the block(s) having the lowest P/E count may be selected as source block(s) if wear leveling is selected at step 300 (e.g., where the summed number of valid pages in the selected block(s) is greater than or equal to the number of pages in a single block, such that there is a sufficient number of valid pages to fill the destination block). Or, if garbage collection is selected at step 300, the block(s) having the fewest number of valid pages may be selected as source block(s) (e.g., where the summed number of valid pages in the selected block(s) is greater than or equal to the number of pages in a single block, such that there is a sufficient number of valid pages to fill the destination block).

At 304, the source blocks in the group of solid state storage cells are read in order to obtain relocated data. In some embodiments, the read-back data is processed by one or more error correction decoders in a solid state storage controller before being written to the open or destination block. For example, this may be desirable because it mitigates error propagation by performing error correction before the (valid) data is written to the destination block. Using FIG. 2 as an example, source blocks 202a and 202b are read, error correction decoding is performed on the read-back data, the invalid pages are discarded after error correction decoding, and the valid pages are written to destination block 204.

At 306, the relocated data is stored in an open block in the group of solid state storage cells, wherein relocated data associated with the selected type of data relocation is stored in the open block and relocated data associated with the unselected type of data relocation is excluded from the open block. Using FIG. 2 as an example, if garbage collection is the selected data relocation operation, then source blocks 202a and 202b are selected by a garbage collection operation and only garbage collected data from source blocks 202a and 202b (e.g., with any invalid pages discarded, if desired) is stored in destination block 204. Similarly, if wear leveling is the selected operation, then source blocks 202a and 202b would have been selected by a wear leveling operation and only wear leveling data from source blocks 202a and 202b (e.g., with any invalid pages discarded, if desired) would be stored in destination block 204.

In some solid state storage systems, a (e.g., single) copyback operation is supported where the copyback operation is faster than performing a read operation followed by a write operation. In some embodiments, steps 304 and 306 are performed using a (e.g., single) copyback operation.

The process of FIG. 3 may be repeated as needed. In various embodiments, a timer and/or some combination of events may dictate when it is time to perform garbage collection or wear leveling, and thus when to perform the process of FIG. 3. In some embodiments, the process of FIG. 3 waits until all host access requests have been completed, so as not to interfere with or otherwise delay the host.

A benefit to the data relocation process described in FIG. 3 is that it reduces write amplification. Write amplification is the ratio of total writes to solid state storage (e.g., between solid state storage controller 102 and solid state storage 110 in FIG. 1, which includes both host writes and overhead writes, for example, associated with data relocation) and host writes to solid state storage (e.g., the writes sent from host 100 to solid state storage controller 102 in FIG. 1). That is:

$$WA = \frac{\text{\# of Host Writes} + \text{\# of Overhead Writes}}{\text{\# of Host Writes}}$$

The ideal or perfect write amplification value is 1 and larger write amplification values are bad, because such values indicate a larger number of overhead write operations per host writes.

The data relocation process described in FIG. 3 mitigates write amplification because hot data is kept with hot data and cold data is kept with cold data. Data that is frequently written or updated is called hot data. One example is a word processing document that is actively being worked on, causing new data or revised/changed data to be added to the word processing document. Data that is infrequently or rarely updated (e.g., after being initially written) is referred to as cold data. Some examples of cold data include a music file or a digital photograph, which tend not to be updated again once stored (note: reading data, even frequently, is neither necessary nor sufficient in classifying data as hot data; data stored a long time ago and not updated subsequently but read frequently would be classified as cold data).

Suppose all closed blocks contain half hot data and half cold data. In that arrangement, the write amplification will be relatively high because the hot data will cause all of the blocks to be garbage collected in due course. In contrast, if half of the blocks had only hot data and the other half of the blocks had only cold data, then only the hot blocks would need to be garbage collected in due course and the write amplification would be lower because fewer blocks would need to be garbage collected. Thus, keeping hot data with hot data and cold data with cold data during data relocation may help keep write amplification down.

The process of FIG. 3 may be helpful in keeping hot data with hot data and cold data with cold data, because data in source blocks selected by garbage collection and wear leveling may have a tendency to be (relatively) hot and cold, respectively. During garbage collection, a common selection technique is to select the block(s) with the fewest number of valid pages as the source block(s). If the invalidated data in those blocks has recently been invalidated, then the temperature of those invalidated data is probably hot. If so, the remaining valid data in these blocks, due to temporal locality, will have similar temperature and thus could be hot as well.

In contrast, source blocks selected by a wear leveling process are likely to be cold because they have not been cycled very many times, and thus have a low P/E count, resulting in their selection as the source block during wear leveling. As such, wear leveled data is likely to be cold.

Although one obvious solution to the problem is to have three open blocks (e.g., one for host writes, one for garbage collection, and one for wear leveling), it may take a significant amount of work to design, test, and manufacture a new storage system with three open blocks instead of two open blocks. It may be easier instead to redesign the solid state storage system so that garbage collected data stays together with garbage collected data and wear leveled data stays together with wear leveled data.

Another possible solution would be to close a partially-written block when switching from garbage collection to wear leveling or vice versa (e.g., where the partially-written block may or may not be reopened later to be filled with more write data). However, this may be undesirable because a partially-written block may be susceptible or vulnerable to read disturb noise (e.g., noise introduced when an adjacent word line is read). It may also be inefficient (for the case where the partially-written block is never filled later on) because the solid state storage media is underutilized and/or may result in increased write amplification (for the case where the partially-written block is filled later on).

The following figure shows an example of the solid state storage shown in FIG. 2 after the process of FIG. 3 is performed on it.

Figure 4:
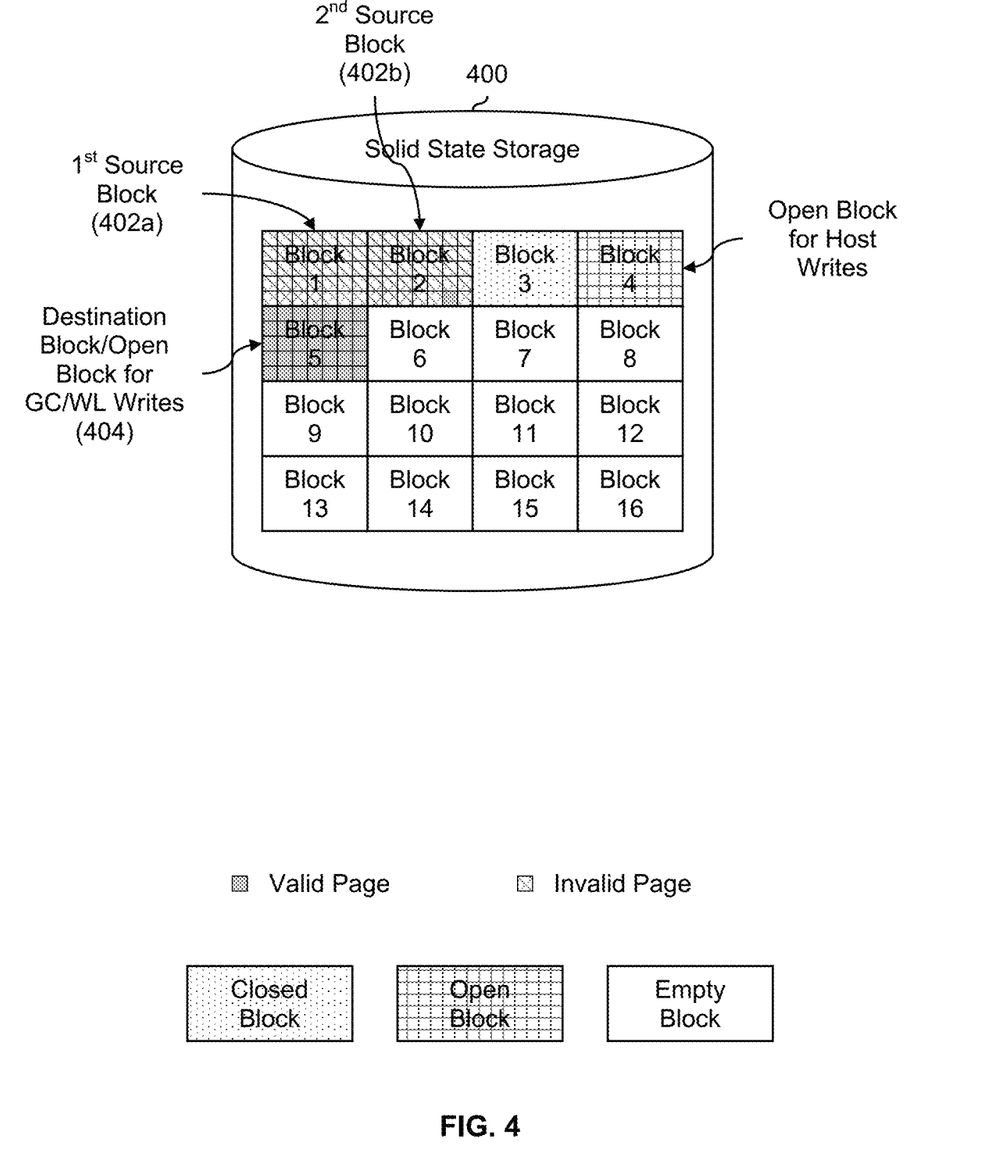
FIG. 4 is a diagram illustrating an embodiment of solid state storage after data relocation.

FIG. 4 is a diagram illustrating an embodiment of solid state storage after data relocation. FIG. 4 continues the examples of FIGS. 2 and 3. In the example shown, all of the data in destination block 404 is valid data. That is, the invalid data from source blocks 402a and 402b was not copied over to destination block 404 during the data relocation process. A single valid page remains in the second source block (402b) since there was one extra valid page that could not fit in destination block 404. Naturally, the (single) valid page that is left behind in either source block 402a or 402b may selected in any appropriate manner.

In the state shown, the first source block (402a) is now empty (e.g., after being read and erased) since there are no valid pages in that block. In some embodiments, there is some collection of block status bits which tracks the status of each block (e.g., closed, open, or empty) and the bits for first source block 402a is set accordingly to reflect its empty status.

The second source block (402b) is still in the closed state since there is still one valid page in it. In some embodiments, stored on solid state storage 400 with each block is some metadata (not shown) for that block. Such metadata may include bits tracking which pages are valid and which pages are invalid. The metadata for source block 402b may be set accordingly to reflect that there is only a single valid page left.

The data relocation process described in FIG. 3 ensures that all of the relocated data in destination block 404 is either all wear leveled data or all garbage collected data, and not some combination of wear level data and garbage collected data. For the reasons described above, keeping wear leveled data and garbage collected data separated during data relocation helps with write amplification since fewer overhead writes need to be performed since hot data will not cause co-located cold data to be (as an example) prematurely and/or unnecessarily garbage collected because of the hot data.

Figure 5:
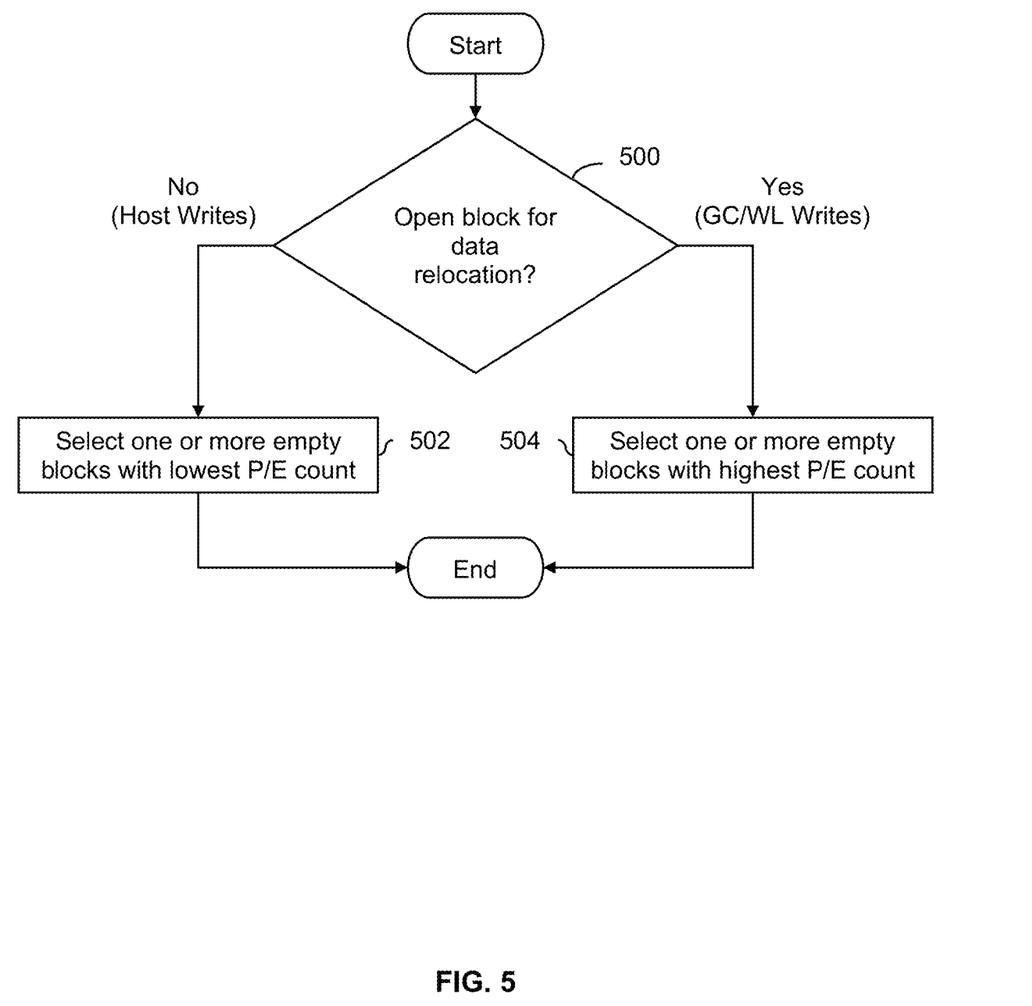
FIG. 5 is a flowchart illustrating an embodiment of a process for selecting a new open block.

The following figure describes a process for selecting a new open block when an open block becomes full. In some embodiments, it is desirable to perform the following process because it helps with wear leveling efficiency. In some embodiments, the process is performed at some point before step 306 in FIG. 3 (e.g., so that the storing step in step 306 has an open block in which to store the relocated data).

FIG. 5 is a flowchart illustrating an embodiment of a process for selecting a new open block. In the example shown, a new or next block to open (sometimes referred to as a destination block) is selected. At 500, it is determined if the open block is for data relocation. Using FIG. 1 as an example, if open block 112 (i.e., for host writes) is full and will be closed, a new open block will need to be opened for host data to be written to. As such, the decision at step 500 would be No. Alternatively, if open block 114 (i.e., for data relocation writes, such as garbage collection writes or wear leveling writes) is full and will be closed, a new open block will need to be opened for relocated data to be written to (i.e., the decision at step 500 would be Yes).

If the decision at step 500 is No (i.e., a block is being opened for host writes), then at 502 one or more empty blocks with the lowest P/E count is/are selected. Using FIG. 1 as an example, the available blocks in that example comprise empty blocks 6-16, and the empty/available block with the lowest P/E count is selected. If the decision at step 500 is Yes (i.e., a block is being opened for data relocation writes), then at 504 one or more empty blocks with the highest P/E count is/are selected.

Although not explicitly described in FIG. 5, once selected, the selected block is written with appropriate data. For example, if the open block is being selected for host writes, then host data may be written to the block selected at 502. If the open block is being selected for data relocation, then garbage collected or wear leveled data may be written to the block selected at 504.

P/E counts are typically tracked by most solid state storage systems (e.g., for wear leveling) and so no new tracking logic would need to be added to most solid state storage systems. The P/E count in such embodiments may be obtained from an appropriate source or entity. For example, there may be some collection or array of counters where the appropriate one is incremented whenever a program or erase is performed on a block. In various embodiments, the empty blocks with the highest and lowest P/E counts (respectively) are determined on-the-fly, or alternatively may be determined a priori.

It may be desirable to select open blocks in the manner described above because it improves wear leveling efficiency. Some other systems or techniques may simply use a first-in, first-out (FIFO) selection process. However, in the case of host writes, the host data is likely to be hot (or at least hotter than relocated data) and thus selecting the empty block with the lowest P/E count will hopefully cause more (relatively speaking) P/E counts to occur on that block. Similarly, it is likely that relocated data (e.g., during garbage collection or wear leveling) is cold (or at least colder than host data) and selecting the empty block with the highest P/E count will hopefully cause fewer (relatively speaking) P/E counts to be put on the block.

Figure 6:
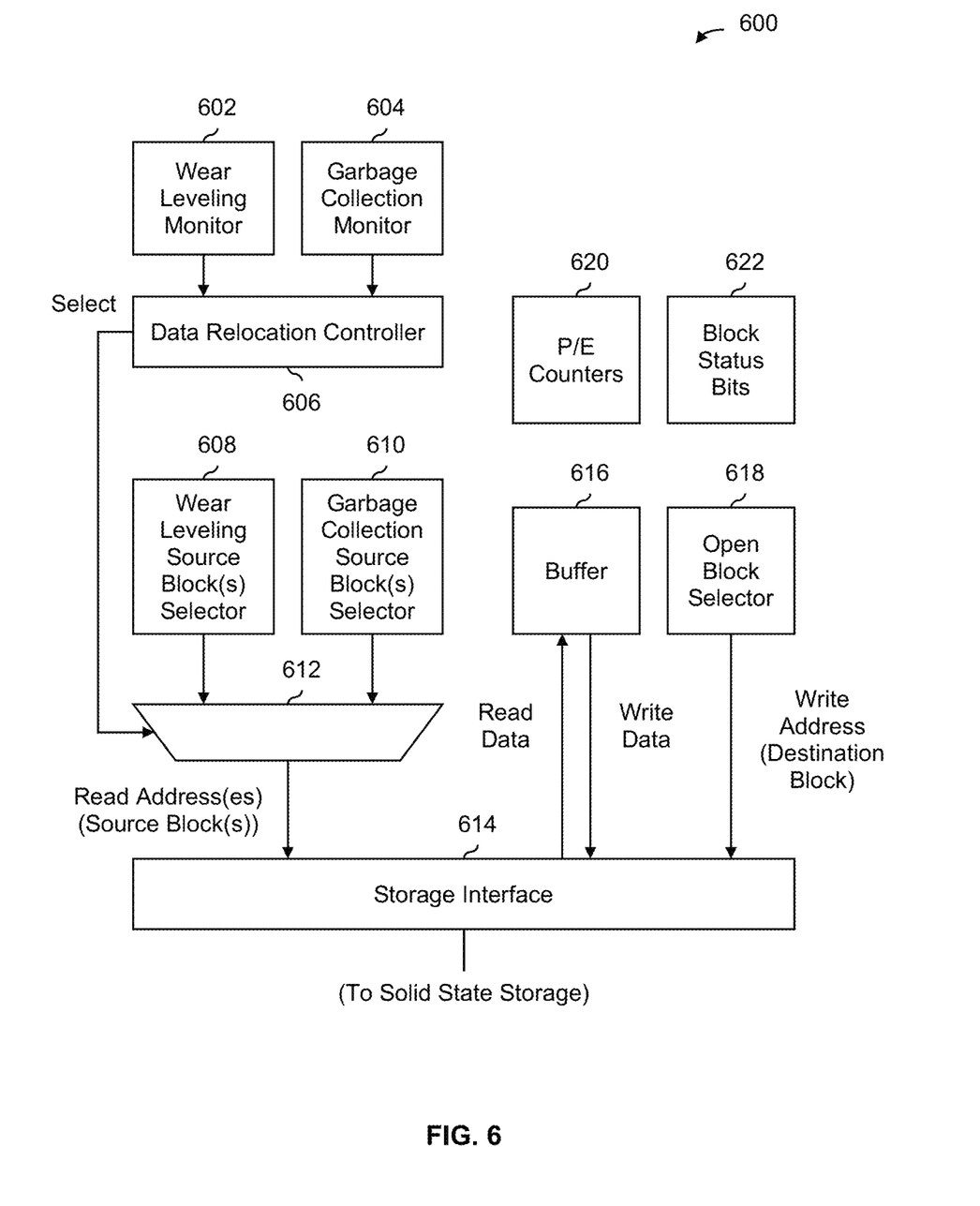
FIG. 6 is a diagram illustrating an embodiment of a solid state storage controller.

The following figure shows an embodiment of a solid state storage controller that performs the process of FIG. 3, as well as the process of FIG. 5. This figure is merely exemplary and is not intended to be limiting.

FIG. 6 is a diagram illustrating an embodiment of a solid state storage controller. In some embodiments, solid state storage controller 102 in FIG. 1 is implemented as shown. Solid state storage controller 600 is one example of a controller that performs the process of FIG. 3, as well as the process of FIG. 5. In some embodiments, solid state storage controller 600 is implemented as a semiconductor, such as an ASIC or an FPGA. It is noted that some components which are not directly related to the processes of FIG. 3 or FIG. 5 are not shown herein; this is merely to preserve readability and/or to more clearly describe the technique(s) and is not intended to be limiting.

Wear leveling monitor 602 and garbage collection monitor 604 are responsible for determining when to perform wear leveling or garbage collection, respectively. In various embodiments, wear leveling monitor 602 and/or garbage collection monitor 604 may be time driven (e.g., based on some timer or countdown) and/or event driven (e.g., some condition(s) are met). In one example, wear leveling monitor 602 is triggered on a periodic basis (e.g., after a certain amount of time has passed since the last wear leveling operation was performed). In another example, garbage collection monitor 604 is triggered when the number of empty blocks (see, e.g., FIG. 1) is less than some threshold and more empty blocks are needed. The techniques described herein work with any number of techniques for wear level monitoring and garbage collection monitoring.

Data relocation controller 606 selects between the monitoring signals generated by wear leveling monitor 602 and garbage collection monitor 604. In one example, the data relocation controller selects the first data relocation operation that asserts its monitoring signal. So, if the signal from wear leveling monitor 602 is asserted first, then data relocation controller 606 opts to perform wear leveling next. Or, if the signal from garbage collection monitor 604 is asserted first, then garbage collection is selected to be performed next. In some embodiments, data relocation controller 606 waits until the system quiets down (e.g., and host instructions would not be delayed by the data relocation operation) before the selected data relocation operation is performed.

Data relocation controller 606 outputs a select signal which controls which input is selected by multiplexer 612 and is thus output as the read address(es). Wear leveling source block(s) selector 608 selects source blocks to wear level based on criteria appropriate to wear leveling; any appropriate selection technique may be used. In one example, the closed block(s) with the lowest P/E count are selected. In some such embodiments, wear leveling source block(s) selector 608 uses P/E counters 620 to know the P/E count for each block and uses block status bits 622 to know the status (e.g., closed, open, or empty) of each block.

Similarly, garbage collection source block(s) selector 610 selects blocks to perform garbage collection on based on garbage collection related criteria. In one example, the closed block(s) with the fewest number of valid blocks is/are selected. Any appropriate selection technique may be used. As described above, the P/E count for each block may be obtained from P/E counters 620 and the status of each block may be obtained from block status bits 622.

In some embodiments, enough blocks are selected by selector 608 or 610 so that the number of valid pages in the selected block(s) is greater than or equal to the number of pages in a block (e.g., so that the open block or destination block is completely filled with valid garbage collected data or valid wear leveled data).

Depending upon which type of data relocation is selected by data relocation controller 606, multiplexer 612 is configured accordingly using the selected signal output by data relocation controller 606. Those selected blocks are passed to storage interface 614 as read address(es). Storage interface 614 handles access of the solid state storage interface, including determining or otherwise obtaining any solid state storage specific access related parameters or configurations, such as the appropriate read threshold value(s) for reading solid state storage, or the number and/or "strength" of program pulses during a program operation. Storage interface 614 reads the specified read addresses from the solid state storage (not shown) and returns read data. Any translation or mapping from logical read address (e.g., logical block address (LBA)) to physical read address may be performed, as needed, and for convenience is not shown herein.

In this example, storage interface 614 obtains read data and stores it in buffer 616. The data read from the read address(es) (i.e., source block(s)) includes valid data and invalid data and (in this example at least) the invalid data is discarded before storage in buffer 616.

Open block selector 618 selects the destination block (also referred to as the open block). As described above, open block selector 618 is an example of a component which performs the open block selection process of FIG. 5. In this example, block status bits 622 are used to track the status (e.g., empty, open, or closed) of each block and P/E counters 620 are used to track the P/E count of each block. Open block selector 618 uses block status bits 622 to determine which blocks are available (i.e., those with an empty status) and which available blocks have the highest P/E count, respectively (see, e.g., step 504 in FIG. 5).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a storage controller configured to:
select one of garbage collection and wear leveling as a selected type of data relocation to perform on a group of solid state storage cells;
identify one or more source blocks in the group of solid state storage cells using the selected type of data relocation;
read the source blocks in the group of solid state storage cells in order to obtain data to be relocated; and
store the data to be relocated in an open block in the group of solid state storage cells, wherein only data to be relocated and associated with the selected type of data relocation is relocated from the source blocks and stored in the open block, at which time the open block contains no data associated with an unselected type of data relocation, and data associated with the unselected type of data relocation from the source blocks is excluded from being relocated to the open block, and the open block contains no data associated with the unselected type of data relocation, wherein the total number of pages in the source blocks is greater than the number of pages in the open block and, during data relocation, at least one valid page in the source blocks remains marked as a valid page, the remaining valid pages in the source blocks becoming invalid as data therein is relocated to the open block.

2. The system recited in claim 1, wherein the storage controller includes a semiconductor device, including one or more of the following: an application-specific integrated circuit (ASIC) or a field-programmable gate array (FPGA).

3. The system recited in claim 1, wherein in the event the selected type of data relocation includes garbage collection, the storage controller includes a garbage collection source block selector and the garbage collection source block selector selects one or more blocks that have the fewest valid pages.

4. The system recited in claim 1, wherein in the event the selected type of data relocation includes wear leveling, the storage controller includes a wear leveling source block selector and the wear leveling source block selector selects one or more blocks that have the lowest program/erase (P/E) counts.

5. The system recited in claim 1, wherein the storage controller is further configured to:
determine if the open block is for data relocation;
in the event it is determined that the open block is for data relocation, select one or more empty blocks with the highest program/erase (P/E) count; and
in the event it is determined that the open block is not for data relocation, select one or more empty blocks with the lowest P/E count.

6. A method, comprising:
selecting one of garbage collection and wear leveling as a selected type of data relocation to perform on a group of solid state storage cells;
using a processor to identify one or more source blocks in the group of solid state storage cells using the selected type of data relocation;
reading the source blocks in the group of solid state storage cells in order to obtain data to be relocated; and
storing the data to be relocated and associated with the selected type of data relocation in an open block in the group of solid state storage cells, wherein only data to be relocated and associated with the selected type of data relocation is relocated from the source blocks and stored in the open block, at which time of storing the open block contains no data associated with an unselected type of data relocation, wherein data associated with the unselected type of data relocation from the source blocks is excluded from being relocated to the open block, and the open block contains no data associated with the unselected type of data relocation, wherein the total number of pages in the source blocks is greater than the number of pages in the open block and, during data relocation, at least one valid page in the source blocks remains marked as a valid page, the remaining valid pages in the source blocks becoming invalid as data therein is relocated to the open block.

7. The method recited in claim 6, wherein the method is performed by a semiconductor device, including one or more of the following: an application-specific integrated circuit (ASIC) or a field-programmable gate array (FPGA).

8. The method recited in claim 6, wherein in the event the selected type of data relocation includes garbage collection, selecting includes selecting one or more blocks that have the fewest valid pages.

9. The method recited in claim 6, wherein in the event the selected type of data relocation includes wear leveling, selecting includes selecting one or more blocks that have the lowest program/erase (P/E) counts.

10. The method recited in claim 6 further comprising:
determining if the open block is for data relocation;
in the event it is determined that the open block is for data relocation, selecting one or more empty blocks with the highest program/erase (P/E) count; and
in the event it is determined that the open block is not for data relocation, selecting one or more empty blocks with the lowest P/E count.

11. A computer program product, the computer program product being embodied in a non-transitory computer readable storage medium and comprising computer instructions for:
selecting one of garbage collection and wear leveling as a selected type of data relocation to perform on a group of solid state storage cells;
identifying one or more source blocks in the group of solid state storage cells using the selected type of data relocation;
reading the source blocks in the group of solid state storage cells in order to obtain data to be relocated; and
storing the data to be relocated and associated with the selected type of data relocation in an open block in the group of solid state storage cells, wherein only data to be relocated and associated with the selected type of data relocation is relocated from the source blocks and stored in the open block, at which time of storing the open block contains no data associated with an unselected type of data relocation, wherein data associated with the unselected type of data relocation from the source blocks is excluded from being relocated to the open block, and the open block contains no data associated with the unselected type of data relocation, wherein the total number of pages in the source blocks is greater than the number of pages in the open block and, during data relocation, at least one valid page in the source blocks remains marked as a valid page, the remaining valid pages in the source blocks becoming invalid as data therein is relocated to the open block.

12. The computer program product recited in claim 11, wherein in the event the selected type of data relocation includes garbage collection, the computer instructions for selecting include computer instructions for selecting one or more blocks that have the fewest valid pages.

13. The computer program product recited in claim 11, wherein in the event the selected type of data relocation includes wear leveling, the computer instructions for selecting includes computer instructions for selecting one or more blocks that have the lowest program/erase (P/E) counts.

14. The computer program product recited in claim 11 further comprising computer instructions for:
determining if the open block is for data relocation;
in the event it is determined that the open block is for data relocation, selecting one or more empty blocks with the highest program/erase (P/E) count; and
in the event it is determined that the open block is not for data relocation, selecting one or more empty blocks with the lowest P/E count.

* * * * *